Patented Feb. 2, 1954

UNITED STATES PATENT OFFICE 2,668,104

PLANT GROWTH REGULANT COMPOSITIONS COMPRISING CHLOROARYLOXYACETIC ACIDS AND ESTERS THEREOF

John D. Eastman, Midland, Mich., assignor to The Dow Chemical Company, Midland, Mich., a corporation of Delaware No Drawing. Application August 23, 1951, Serial No. 243,352

11 Claims. (Cl. 71—2.6)

This invention relates to plant growth regulators and is particularly concerned with improved compositions adapted to be employed for the control of the growth of vegetation.

Many derivatives of chloroaryloxyacetic acids have been suggested for use as plant growth regulators to influence plant responses of different kinds e. g., sprout inhibition, prevention of premature fruit fall, rooting, and the prevention of growth of undesired plant species. Among these, the lower alkyl ester derivatives have enjoyed a considerable degree of commercial success. However, the possibility of injury to adjacent untreated plants resulting from vapors of the active compound arising from the treated surfaces has somewhat limited the use of the materials. A recent trend has been toward the herbicidal application of "low-volatile" esters, such as the glycol ether-esters and polyglycol ether-esters. The formulation and use of these latter compounds, however, present certain problems. For example, the glycol or polyglycol ethers employed in their preparation are relatively expensive. Moreover, the molecular weight of the glycol and polyglycol ethers is of sufficient magnitude that the radicals derived therefrom constitute an appreciable proportion of the weight of the finished esters. This latter factor places a definite upper limit on the concentration in terms of acid equivalent which can be obtained when using these esters in preparing herbicidal concentrates.

Similarly, the free chloroaryloxyacetic acids have been previously employed as constituents of plant growth regulator materials. These compounds are active herbicidally and have the virtue of low volatility. However, considerable difficulty has been encountered in formulating satisfactory commercial compositions with the free acids, particularly when it is desired to obtain a liquid growth regulant concentrate suitable for dilution with inexpensive petroleum distillate or for emulsification in water. A further difficulty is encountered in attempting to prepare liquid concentrates of the above type which can be stored under conditions of low temperature without depositing crystalline material.

It is an object of the present invention to provide plant growth regulant compositions possessing the advantages of the "low-volatile" ester compositions and at the same time achieving a higher acid equivalent than can be obtained with presently available materials. An additional object is to supply improved herbicidal compositions. A further object is to provide compositions with the aforementioned advantages by the use of less costly ingredients. Yet another object is to provide compositions which do not deposit crystalline material when stored at low temperatures. Other objects will become apparent from the following specification and claims.

According to the present invention, it has been discovered that compositions comprising as active plant growth regulant ingredients a chloroaryloxyacetic acid dissolved in a glycol ether-ester of a chloroaryloxyacetic acid have physical characteristics superior to those inherent in compositions containing either ingredient alone. The compositions of the invention are very active as plant growth regulators and are particularly useful as herbicides and as the active ingredient of herbicidal compositions.

A preferred embodiment of the invention resides in the composition as described wherein the chloroaryloxyacetic acid has the formula:

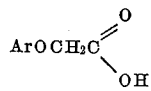

and the glycol ether-ester derivative has the formula:

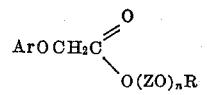

In the above and succeeding formulas, Ar represents a haloaryl radiral such as 2,4-dichlorophenyl, 2 - methyl-4-chlorophenyl or 2,4,5-trichlorophenyl, Z represents an alkylene radical containing from 2 to 3 carbon atoms, inclusive, $n$ is an integer not greater than 3 and R is an alkyl radical containing from 1 to 4 carbon atoms, inclusive. The plant growth regulant concentrate compositions obtained in accordance with this invention are oily liquids, substantially insoluble in water and soluble in many organic solvents. They are characterized by the advantages of high plant growth regulant activity in conjunction with low volatility. A further advantage resides in the employing of the relatively cheap free chloroaryloxyacetic acids to increase the acid equivalent value of compositions containing the more costly glycol ether-esters. The term "acid equivalent," as herein employed, refers to the total content of chloroaryloxyacetyl radicals present in the composition, whether as free acid or as an ester, calculated, however, as though in the acid condition.

Any suitable proportion of the chloroaryloxyacetic acid may be employed which is soluble in the glycol ether-ester of a chloroaryloxyacetic acid as described above. The preferred amounts of materials are dependent on the type of composition in which the plant growth regulant solution is formulated and/or applied, the nature of the vegetation to be controlled and the particular acid and ester employed. In practice, at least 4 percent by weight of acid is used, based on the weight of ester in the composition, and in general, from about 5 to 25 parts by weight of acid are employed for each 100 parts of ester, although greater proportional amounts of acid may be employed where solubility permits.

In operating in accordance with the present invention, the chloroaryloxyacetic acid and ester as set forth above are mixed together at a temperature of from 20° to 80° C. with stirring for a period of time until the acid is completely dissolved. The solution so obtained may be further compounded with wetting and emulsifying agents to render it readily dispersible in water. Alternatively, the plant growth regulant solution may be compounded with carriers such as organic solvents or solvent oils. In a further embodiment of the invention, emulsifiable herbicidal concentrates may be prepared in which the plant growth regulant solution is combined with a wetting or emulsifying agent and a minor proportion of an organic solvent or a solvent oil.

The term "solvent oils," as used herein, refers to hydrocarbon liquids which are aromatic in nature or contain at least 40% aromatic hydrocarbons. Typical examples of these hydrocarbon liquids are toluene, xylene, butyl benzene, methylated naphthalenes and aromatic oils derived from the refining of petroleum, shale oil and coal. A representative petroleum solvent oil suitable for use in the compositions of the invention has the following properties:

| | |
|---|---|
| Specific gravity at 60° F. | 0.8956 |
| Flash point (Tag closed cup) °F. | 160 |
| Boiling point: | |
| Initial °F. | 376 |
| End °F. | 500 |
| Kauri-butanol number | 71 |

In the preparation of sprays, the new plant growth regulant solutions or herbicidal concentrate compositions containing the same are commonly diluted with a hydrocarbon carrier such as fuel oil, diesel oil or kerosene or emulsified in water before being applied. In certain instances it is desirable to prepare spray mixtures which contain both the plant growth regulant solution and a hydrocarbon carrier emulsified together in water. The amount of the new compositions to be used varies over a range depending on the type of vegetation to be controlled, the stage of growth thereof, the season of the year, and the degree of selective action desired. In general, the compositions will be used in such quantity as to provide from about 0.25 to 8 pounds of acid equivalent of chloroaryloxyacetic acid per acre, although greater amounts will sometimes be used as, for example, in the control of resistant, woody species. In the application of spray mixtures, diluted with carriers as set forth above, the volume to be applied varies widely, depending on such factors as the type of vegetation and the available spray equipment. Good results have been obtained when using from 5 to 200 gallons of spray mixture per acre.

Any suitable oil-soluble wetting and emulsifying agents may be used in conjunction with the compositions of the invention. In practice, it is preferred to employ the non-ionic emulsifying agents such as polyglycol fatty acid esters, ethylene oxide-fatty alcohol condensates, glycerol monofatty acid esters, alkyl aryl polyglycols, tall oil-ethylene oxide condensation products, hexitan esters and hexitan ester polyoxyethylene derivatives. However, dispersing agents such as the mahogany soaps, sulfonated castor oil and the like may be employed.

The following examples illustrate the invention but are not to be construed as limiting the same.

Example 1

2 moles of 2,4-dichlorophenoxyacetic acid and 2 milliliters of concentrated sulfuric acid were dispersed in 3 moles of butoxy-propoxy-propanol (dipropylene glycol butyl ether) with stirring. The mixture was heated under vacuum at temperatures of from 70° to 125° C. for a period of 16 hours. During this time, water of reaction accompanied by dipropylene glycol butyl ether distilled out of the reaction zone. Upon completion of the reaction, the crude reaction product was dissolved in carbon tetrachloride, washed successively with dilute aqueous sodium carbonate solution and water, and treated with activated charcoal. The resulting mixture was filtered and the filtrate fractionally distilled to obtain as a residue a technical dipropylene glycol butyl ether ester of 2,4-dichlorophenoxyacetic acid. The dipropylene glycol butyl ether ester of 2,4-dichlorophenoxyacetic acid is an oily liquid having a refractive index $(n/D)$ of 1.497 at 25° C., a chlorine content of 17.9 percent by weight and a saponification number of 144.

The product prepared as described above was used in preparing the following composition:

| | Parts by weight |
|---|---|
| Dipropylene glycol butyl ether ester of 2,4-dichlorophenoxyacetic acid | 92 |
| 2,4-dichlorophenoxyacetic acid | 8 |

This composition was prepared by dissolving the acid in the ester with agitation at room temperature. The composition remained a homogeneous solution when stored at a temperature of −18° C. and seeded with a crystal of 2,4-dichlorophenoxyacetic acid. One part of this composition is diluted with 20 to 100 parts of kerosene or fuel oil to obtain a spray composition useful for the control of brush and woody plants.

Example 2

| | Parts by weight |
|---|---|
| Dipropylene glycol butyl ether ester of 2,4-dichlorophenoxyacetic acid | 40.54 |
| 2,4-dichlorophenoxyacetic acid | 8.76 |
| Triton X-155* | 10.16 |
| Solvent oil | 40.54 |

* Triton X-155 is a commercial emulsifying agent identified as a dimeric alkylated aryl polyether alcohol.

The acid was dissolved in the ester and the emulsifying agent and petroleum solvent were then added at room temperature with stirring. This composition remained a solution when stored at a temperature of −18° C. and seeded with a crystal of 2,4-dichlorophenoxyacetic acid. The acid equivalent of the composition is 31.3 percent by weight. To obtain an equal acid equivalent by using the ester with no free acid added would require 56.3 percent ester. The composition is readily dispersible in water to prepare aqueous sprays adapted to be employed for the control of plant growth.

Example 3

| | Parts by weight |
|---|---|
| Dipropylene glycol butyl ether ester of 2,4-dichlorophenoxyacetic acid | 48 |
| 2,4-dichlorophenoxyacetic acid | 10 |
| Triton X-155 | 15 |
| Solvent oil | 27 |

This composition, prepared as in Example 2, deposited no crystalline material at −7° C. The acid equivalent of the composition is 37 percent by weight. To obtain an equal acid equivalent without the use of free acid would require 65.8 percent of this ester.

The composition was dispersed in water so as to prepare a spray mixture containing 0.83 pound of acid equivalent per 100 gallons of spray. This mixture was applied to actively growing plants and was found to give plant growth control indistinguishable from that obtained with a commercial low-volatile ester formulation applied at the same rate and concentration in terms of acid equivalent.

Example 4

111 pounds of 2,4-dichlorophenoxyacetic acid and 5 pounds of a sulfonated polystyrene resin were dispersed in 77 pounds of polypropylene glycol butyl ether with stirring.

The polypropylene glycol butyl ether product used in this preparation had the following composition:

| | Per cent |
|---|---|
| Monopropylene glycol butyl ether | 72 |
| Dipropylene glycol butyl ether | 20 |
| Tripropylene glycol butyl ether | 8 |

The mixture as set forth above was heated under vacuum at temperatures up to 125° C. During the heating period water of reaction distilled out of the reaction zone. Upon completion of the reaction, the crude product was filtered to obtain a technical polypropylene glycol butyl ether ester of 2,4-dichlorophenoxyacetic acid. This product has a specific gravity of 1.165, a refractive index ($n/D$) at 25° C. of 1.4982, a chlorine content of 19.2 percent by weight and a saponification number of 155.

The following compositions were prepared from the above material.

Composition A:

| | Parts by weight |
|---|---|
| Polypropylene glycol butyl ether ester of 2,4-dichlorophenoxyacetic acid | 49.2 |
| 2,4-dichlorophenoxyacetic acid | 10.0 |
| Triton X-155 | 15.0 |
| Solvent oil | 25.8 |

Composition B:

| | Parts by weight |
|---|---|
| Polypropylene glycol butyl ether ester of 2,4-dichlorophenoxyacetic acid | 49.2 |
| 2,4,5-trichlorophenoxyacetic acid | 10.0 |
| Triton X-155 | 15.0 |
| Solvent oil | 25.8 |

Compositions A and B each have an acid equivalent of 40 percent by weight. Neither composition showed any crystallization of acid after 72 hours' storage at −18° C. Each of the compositions was separately dispersed in water to give an aqueous spray dispersion containing 0.42 pound of acid equivalent per 100 gallons. The latter dispersions were separately applied to groups of young pigweed plants so as to wet the foliage thoroughly. Subsequent observations indicated plant growth control with these compositions indistinguishable from that obtained with a commercial-type low-volatile ester composition applied at the same concentration of 2,4-dichlorophenoxyacetic acid in terms of acid equivalent.

Example 5

1 mole of ethoxy propoxy propanol (dipropylene glycol ethyl ether), 1 mole of 2,4-dichlorophenoxyacetic acid, 1 milliliter of concentrated sulfuric acid and 200 milliliters of ethylene dichloride were dispersed together and heated to a temperature of 95° to 110° C. for a period of 2 hours. During this time, water of reaction and ethylene dichloride distilled out of the reaction zone. The distillate was condensed and collected in a separator which retained the water of reaction and returned the ethylene dichloride to the reaction mixture. Upon completion of the reaction, the crude product was washed twice with dilute aqueous sodium carbonate solution and with water. Low boiling constituents were then removed by vacuum distillation to obtain as a distillation residue a technical dipropylene glycol ethyl ether ester of 2,4-dichlorophenoxyacetic acid. This product, which analyzed 19.56 percent chlorine, was used to prepare the following concentrate composition:

| | Parts by weight |
|---|---|
| Dipropylene glycol ethyl ether ester of 2,4-dichlorophenoxyacetic acid | 90 |
| 2,4-dichlorophenoxyacetic acid | 10 |

This composition, prepared as in Example 1, remained a homogeneous solution when stored at a temperature of −18° C. and seeded with a crystal of 2,4-dichlorophenoxyacetic acid.

One part of the composition is diluted with 20 to 100 parts of kerosene or fuel oil to obtain a spray composition useful for the control of woody plants. In a further operation, 5 to 6 parts of the concentrate composition, 1 to 1.5 parts of emulsifying agent and 2 to 3 parts of solvent oil are combined to prepare an emulsifiable concentrate suitable for dispersion in water to form aqueous spray compositions for the control of plant growth.

Example 6

1 mole of dipropylene glycol isopropyl ether, 1 mole of 2,4-dichlorophenoxyacetic acid and 2 milliliters of concentrated sulfuric acid were dispersed in 200 milliliters of ethylene dichloride and the reaction and purification were carried out as in Example 5 to obtain a technical dipropylene glycol isopropyl ether ester of 2,4-dichlorophenoxyacetic acid. This product, which had a refractive index ($n/D$) of 1.4982 at 25° C., was used to prepare the following composition:

| | Parts by weight |
|---|---|
| Dipropylene glycol isopropyl ether ester of 2,4-dichlorophenoxyacetic acid | 90 |
| 2,4-dichlorophenoxyacetic acid | 10 |

This composition, prepared as in Example 1, remained a homogeneous solution when stored at a temperature at −18° C. and seeded with a crystal of 2,4-dichlorophenoxyacetic acid. It is suitable for uses as set forth in Example 5.

Example 7

225 pounds (1.02 moles of 2,4-dichlorophenoxyacetic acid, 200 pounds (1.11 moles) of polypropylene glycol methyl ether and 15 pounds of a sulfonated polystyrene were dispersed together and heated to a temperature of 130° C. under vacuum. The polypropylene glycol methyl ether product used in this preparation had the following composition:

| | Parts by weight |
|---|---|
| Dipropylene glycol methyl ether | 60 |
| Tripropylene glycol methyl ether | 26 |
| Tetrapropylene glycol methyl ether | 14 |

The reaction mixture was heated as set forth above for a total of 137 hours. During this period, water of reaction together with some polypropylene glycol methyl ether distilled out of the reaction zone and an additional 47 pounds of the polypropylene glycol methyl ether product was added. On completion of the reaction, the crude product was filtered and held at a temperature of 60 to 70° C. while 13 pounds of sodium carbonate was added with stirring. The resulting mixture was filtered to obtain a technical polypropylene glycol methyl ether ester of 2,4-dichlorophenoxyacetic acid. This product, which analyzed 18.58 percent chlorine and had a specific gravity of 1.226, was used in preparing the following composition:

| | Parts by weight |
|---|---|
| Polypropylene glycol methyl ether ester of 2,4-dichlorophenoxyacetic acid | 90 |
| 2,4-dichlorophenoxyacetic acid | 10 |

This composition, prepared as in Example 1, remained a homogeneous solution when stored at a temperature of −18° C. and seeded with a crystal of 2,4-dichlorophenoxyacetic acid. It is suitable for uses as in Example 5.

Example 8

221 grams of 2,4-dichlorophenoxyacetic acid, 191.8 grams of polypropylene glycol isopropyl ether and 1 milliliter of concentrated sulfuric acid were dispersed in 200 milliliters of ethylene dichloride. The polypropylene glycol isopropyl ether product used in this preparation contained 8.91 percent by weight of free hydroxy radical by analysis and was composed substantially of equal proportions by weight of isopropoxy propoxy propanol and isopropoxy propoxy propoxy propanol with a minor proportion of isopropoxy propanol. The reaction of the ingredients, as set forth above, and purification of the product were carried out according to the procedure of Example 5 to obtain a technical polypropylene glycol isopropyl ether of 2,4-dichlorophenoxyacetic acid. This product, which analyzed 17.78 percent chlorine and had a saponification number of 143.5, was used in preparing the following composition:

| | Parts by weight |
|---|---|
| Polypropylene glycol isopropyl ether ester of 2,4-dichlorophenoxyacetic acid | 90 |
| 2,4-dichlorophenoxyacetic acid | 10 |

This composition, prepared as in Example 1, remained a homogeneous solution when stored at a temperature of −18° C. and seeded with a crystal of 2,4-dichlorophenoxyacetic acid. It is suitable for uses as set forth in Example 5.

Example 9

1.577 moles of 2,4-dichlorophenoxyacetic acid and 2 milliliters of concentrated sulfuric acid were dispersed in 1.66 moles of tripropylene glycol butyl ether with stirring. The mixture was heated to a temperature of 100° to 135° C. under vacuum for a period of 19 hours during which water of reaction distilled out of the reaction zone. Upon completion of the reaction, the crude product was dissolved in carbon tetrachloride and washed with an aqueous solution of ammonium bicarbonate and with water. Carbon tetrachloride was then recovered by distillation to obtain as a residue a technical tripropylene glycol butyl ether ester of 2,4-dichlorophenoxyacetic acid. This product, which analyzed 14.5 percent chlorine and had a saponification number of 118, was used in preparing the following concentrate composition:

| | Parts by weight |
|---|---|
| Tripropylene glycol butyl ether ester of 2,4-dichlorophenoxyacetic acid | 90 |
| 2,4-dichlorophenoxyacetic acid | 10 |

This composition, prepared as in Example 1, remained a homogeneous solution when stored at a temperature of −18° C. and seeded with a crystal of 2,4-dichlorophenoxyacetic acid. It is suitable for uses as set forth in Example 5.

Example 10

90 pounds of polypropylene glycol butyl ether as described in Example 4, 112 pounds of 4-chloro-2-methylphenoxyacetic acid and 39 grams of phenol sulfonic acid were mixed together with stirring and heated under vacuum at temperatures up to 120° C. for a period of 50 hours. During this time, water of reaction was distilled out of the reaction zone. Upon completion of the reaction, the crude reaction product was treated with 15 grams of ammonium bicarbonate, stirred thoroughly and filtered to obtain a technical polypropylene glycol butyl ether ester of 4-chloro-2-methylphenoxyacetic acid. This product, which analyzed 11.54 percent chlorine and had a saponification number of 168.5, was used in preparing the following concentrate composition:

| | Parts by weight |
|---|---|
| Polypropylene glycol butyl ether ester of 4-chloro-2-methylphenoxyacetic acid | 90 |
| 4-chloro-2-methylphenoxyacetic acid | 10 |

This composition was prepared by dissolving the acid in the ester with agitation at room temperature. The composition which remained a homogeneous solution when stored at a temperature of −18° C. and seeded with a crystal of 4-chloro-2-methylphenoxyacetic acid, is suitable for uses as set forth in Example 5.

Example 11

2,4,5-trichlorophenoxyacetic acid was dissolved in the polypropylene glycol butyl ether product described in Example 4. The ingredients were used in the proportion of 255.5 pounds of acid to each 178 pounds (10 percent excess) of polyglycol ether and solution was effected by stirring at a temperature of 60° C. Phenol sulfonic acid was added in the amount of ½ percent by weight based on the total charge of reactants, and the mixture was heated under vacuum for a period of 24 hours at gradually increasing temperatures up to a temperature of 135° C. During this period water of reaction and some of the excess polyglycol ether distilled out of the reaction zone. Upon completion of the reaction the remaining excess of polyglycol ether was recovered by distillation under vacuum and ammonium bicarbonate was added to the crude product with stirring. The resulting mixture was filtered to obtain a technical polypropylene glycol butyl ether ester of 2,4,5-trichlorophenoxyacetic acid as a clear, oily liquid having a saponification number of 147. This product was used in preparing the following composition:

Composition C:  Parts by weight
Polypropylene glycol butyl ether ester of
   2,4,5-trichlorophenoxyacetic acid____ 43.6
2,4,5-trichlorophenoxyacetic acid_____ 12.3
Triton X-155_____ 15.0
Solvent oil_____ 29.1

This composition was prepared by the method of Example 2 and has an acid equivalent of 41.5 percent by weight. A weighed portion of the composition was dispersed in water to form an aqueous spray mixture containing 1 pound of acid equivalent per 100 gallons. This spray mixture was applied to a field plot containing gramineous species infested with broad-leafed weeds including dandelion, plantain, sow thistle and prickly lettuce. In an inspection of the plot two weeks after spraying it was found that the broadleafed weeds were being killed without apparent adverse effect on the gramineous species.

In a further operation the following composition was prepared:

Composition D:  Parts by weight
Polypropylene glycol butyl ether ester of
   2,4,5-trichlorophenoxyacetic acid____ 45.9
2,4-dichlorophenoxyacetic acid_____ 10.0
Triton X-155_____ 15.0
Solvent oil_____ 29.1

This composition was prepared by the method of Example 2 and has an acid equivalent of 40.7 percent by weight. It remained a homogeneous solution when stored at a temperature of −18° C. and seeded with a crystal of 2,4-dichlorophenoxyacetic acid.

Compositions C and D were separately dispersed in water to prepare aqueous spray compositions containing 0.42 pound of acid equivalent per hundred gallons. The spray compositions were respectively applied to groups of young pigweed plants so as to wet the foliage thoroughly. Subsequent observations indicated plant growth control with these compositions indistinguishable from that obtained with a commercial-type low-volatile ester composition applied at the same concentration of 2,4,5-trichlorophenoxyacetic acid in terms of acid equivalent.

*Example 12*

1 mole of monopropylene glycol isopropyl ether (2-isopropoxyisopropanol), 1 mole of 2,4-dichlorophenoxyacetic acid and 2 milliliters of concentrated sulfuric acid were dispersed in 200 milliliters of ethylene dichloride and the reaction and purification carried out as in Example 5 to obtain a technical monopropylene glycol isopropyl ether ester of 2,4-dichlorophenoxyacetic acid. This product has a refractive index $(n/D)$ of 1.5122 and a chlorine content of 22.8 percent by weight.

The following composition was prepared by the method of Example 1.

Parts by weight
Monopropylene glycol isopropyl ether ester of
   2,4-dichlorophenoxyacetic acid_____ 90
2,4-dichlorophenoxyacetic acid_____ 10

This composition remained a homogeneous solution when stored at a temperature of −18° C. and seeded with a crystal of 2,4-dichlorophenoxyacetic acid. It is suitable for uses as set forth in Example 5.

*Example 13*

1 mole of monopropylene glycol methyl ether (2-methoxy-1-propanol), 1 mole of 2,4-dichlorophenoxyacetic acid and 1 milliliter of concentrated sulfuric acid were dispersed in 200 milliliters of ethylene dichloride. The reaction and purification were carried out as in Example 5 to obtain a technical monopropylene glycol methyl ether ester of 2,4-dichlorophenoxyacetic acid. This product has a refractive index $(n/D)$ of 1.521 and a saponification number of 190.4.

The following composition was prepared by the method of Example 1.

Parts by weight
Monopropylene glycol methyl ether ester of
   2,4-dichlorophenoxyacetic acid_____ 90
2,4-dichlorophenoxyacetic acid_____ 10

This composition remained a homogeneous solution when stored at a temperature of −18° C. and seeded with a crystal of 2,4-dichlorophenoxyacetic acid. It is suitable for uses as set forth in Example 5.

*Example 14*

Composition E:  Parts by weight
Polypropylene glycol butyl ether ester of
   2,4-dichlorophenoxyacetic acid_____ 70.2
2,4-dichlorophenoxyacetic acid_____ 6.9
Atlas G-1096*_____ 5.9
Solvent oil_____ 17.0

Composition F:
Polypropylene glycol butyl ether ester of
   2,4,5-trichlorophenoxyacetic acid_____ 65.4
2,4,5-trichlorophenoxyacetic acid_____ 6.3
Atlas G-1096*_____ 6.0
Solvent oil_____ 22.3

*Atlas G-1096 is a commercial emulsifying agent identified as an oleic acid derivative of polyoxyethylene sorbitol.

The above compositions were prepared by the method of Example 2. Each contains 4.7 pounds of acid equivalent per gallon.

Composition E was dispersed in water to give a spray mixture containing 1 pound of acid equivalent per 100 gallons. This mixture was applied with a power sprayer at the rate of 50 gallons per acre on turf infested with dandelions and buckhorn plantain. Identical operations using composition F were carried out on a similar plot of turf. Selective control of dandelion and plantain without injury to the grass was obtained with both compositions.

Composition F was diluted with No. 2 fuel oil to obtain spray compositions containing 12, 16, 20 and 24 pounds of acid equivalent per 100 gallons, respectively. These compositions were individually applied during the dormant season to plots of scrub oak growing on a utility right-of-way. The materials were applied so as to wet thoroughly the lower 1 to 2 feet of the brush. Control of scrub oak, when investigated after 5 months, was indistinguishable from that obtained with a commercial low-volatile ester formulation of 2,4,5-trichlorophenoxyacetic acid applied at the same rates in terms of acid equivalent.

*Example 15*

2 moles of 2,4-dichlorophenoxyacetic acid, 2.1 moles of monoethylene glycol butyl ether (butoxyethanol) and 4.5 grams of p-phenosulfonic acid were dispersed together and heated at 108° to 140° C. for 20 hours. During this time water of reaction, together with the excess ethylene glycol butyl ether, distilled out of the reaction zone.

Upon completion of the reaction, the crude product was filtered to obtain a technical monoethylene glycol butyl ether ester of 2,4-dichlorophenoxyacetic acid. The monoethylene glycol butyl ether ester of 2,4-dichlorophenoxyacetic acid is an oily liquid having a specific gravity of 1.232 at 20° C. and boiling at 156° to 162° C. under 1 millimeter pressure.

The product prepared as described above was used to prepare the following composition in accordance with the method of Example 1.

| | Parts by weight |
|---|---|
| Monethylene glycol butyl ether ester of 2,4-dichlorophenoxyacetic acid | 89.6 |
| 2,4-dichlorophenoxyacetic acid | 10.4 |

This composition, which showed no separation of crystalline material when stored at −18° C. and seeded with a crystal of 2,4-dichlorophenoxyacetic acid, is suitable for uses as set forth in Example 5.

*Example 16*

2 moles of 2,4,5-trichlorophenoxyacetic acid, 2.1 moles of monoethylene glycol butyl ether and 5 grams of p-phenolsulfonic acid were dispersed together and reacted according to the procedure of Example 15. During the course of the reaction 24 grams additional monoethylene glycol butyl ether was added to replace material which distilled out of the reaction zone. The crude product was filtered to obtain a technical monoethylene glycol butyl ether ester of 2,4,5-trichlorophenoxyacetic acid. The monoethylene glycol butyl ether ester of 2,4,5-trichlorophenoxyacetic acid is an oily liquid having a specific gravity of 1.280 at 20° C. and boiling at 163° to 166° C. under a pressure of 1 millimeter.

The product, prepared as described above, was used to prepare the following composition in accordance with the method of Example 1.

| | Parts by weight |
|---|---|
| Monoethylene glycol butyl ether ester of 2,4,5-trichlorophenoxyacetic acid | 95 |
| 2,4,5-trichlorophenoxyacetic acid | 5 |

This composition, which showed no separation of crystalline material when stored at −18° C. and seeded with a crystal of 2,4,5-trichlorophenoxyacetic acid, is suitable for uses as set forth in Example 5.

I claim:

1. A composition for controlling the growth of vegetation which comprises as active ingredients (1) a chloroaryloxyacetic acid in solution in (2) a glycol ether ester of a chloroaryloxyacetic acid, said acid being present in the amount of at least 4 percent by weight based on the weight of ester.

2. A composition for controlling the growth of vegetation which comprises a carrier and dispersed therein as active ingredients (1) a chloroaryloxyacetic acid and (2) an ester of the formula:

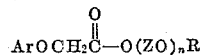

in which formula Ar represents a chloroaryl radical, Z represents an alkylene radical containing 2 to 3 carbon atoms, inclusive, n is a integer not greater than 3 and R is an alkyl radical containing 1 to 4 carbon atoms, inclusive, and wherein the acid (1) is dissolved in the ester (2), said acid being present in the amount of at least 5 parts by weight per 100 parts by weight of said ester.

3. A plant growth regulator concentrate comprising a solvent oil, a wetting and emulsifying agent and in solution therewith as active ingredients, (1) a chloroaryloxyacetic acid and (2) an ester of the formula:

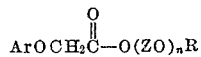

wherein Ar represents a chloroaryl radical, Z represents an alkylene radical containing 2 to 3 carbon atoms, inclusive, n is an integer not greater than 3 and R is an alkyl radical containing 1 to 4 carbon atoms, inclusive, said acid being present in the amount of at least 5 parts by weight per 100 parts by weight of said ester.

4. A composition according to claim 3 in which the chloroaryloxyacetic acid is 2,4-dichlorophenoxyacetic acid.

5. A composition according to claim 3 in which the chloroaryloxyacetic acid is 2,4,5-trichlorophenoxyacetic acid.

6. A composition according to claim 3 in which the chloroaryloxyacetic acid is 2-methyl-4-chlorophenoxyacetic acid.

7. A composition according to claim 3 in which the ester is the monopropylene glycol butyl ether ester of 2,4,5-trichlorophenoxyacetic acid.

8. A composition according to claim 3 in which the ester is the monopropylene glycol butyl ether ester of 2,4-dichlorophenoxyacetic acid.

9. A composition for controlling the growth of vegetation which comprises a carrier, a wetting and emulsifying agent and dispersed therein a solution of 2,4-dichlorophenoxyacetic acid in the monopropylene glycol butyl ether ester of 2,4-dichlorophenoxyacetic acid, said acid being present in the amount of at least 5 parts by weight per 100 parts by weight of said ester.

10. A composition for controlling the growth of vegetation which comprises a carrier, a wetting and emulsifying agent and dispersed therein a solution of 2,4,5-trichlorophenoxyacetic acid in the monopropylene glycol butyl ether ester of 2,4,5-trichlorophenoxyacetic acid, said acid being present in the amount of at least 5 parts by weight per 100 parts by weight of said ester.

11. A composition for controlling the growth of vegetation which comprises a carrier, a wetting and emulsifying agent and dispersed therein a solution of 2-methyl-4-chlorophenoxyacetic acid in the monopropylene glycol butyl ether ester of 2-methyl-4-chlorophenoxyacetic acid, said acid being present in the amount of at least 5 parts by weight per 100 parts by weight of said ester.

JOHN D. EASTMAN.

References Cited in the file of this patent

UNITED STATES PATENTS

| Number | Name | Date |
|---|---|---|
| 2,394,916 | Jones | Feb. 12, 1946 |
| 2,523,227 | Mullison | Sept. 19, 1950 |
| 2,523,228 | Mullison | Sept. 19, 1950 |
| 2,557,613 | Stull | June 19, 1951 |
| 2,562,855 | Britton | July 31, 1951 |

OTHER REFERENCES

Botanical Gazette, June 1949, pages 632 to 636.